(12) United States Patent
Rangaiah

(10) Patent No.: US 10,805,978 B2
(45) Date of Patent: Oct. 13, 2020

(54) SYSTEM, METHOD AND DEVICE FOR EARLY CONNECTION RELEASE OF USER EQUIPMENT FROM COMMUNICATIONS NETWORK

(71) Applicant: ARM LTD, Cambridge (GB)

(72) Inventor: Raghavendra Magadi Rangaiah, Lower Earley (GB)

(73) Assignee: ARM LTD, Cambridge (GB)

( * ) Notice: Subject to any disclaimer, the term of this patent is extended or adjusted under 35 U.S.C. 154(b) by 16 days.

(21) Appl. No.: 15/793,310

(22) Filed: Oct. 25, 2017

(65) Prior Publication Data

US 2019/0124702 A1  Apr. 25, 2019

(51) Int. Cl.

| | |
|---|---|
| *H04W 76/30* | (2018.01) |
| *H04W 76/27* | (2018.01) |
| *H04W 52/02* | (2009.01) |
| *H04L 1/18* | (2006.01) |
| *H04L 29/06* | (2006.01) |
| *H04W 76/28* | (2018.01) |

(52) U.S. Cl.
CPC ........... *H04W 76/27* (2018.02); *H04L 1/1848* (2013.01); *H04L 69/28* (2013.01); *H04W 52/0241* (2013.01); *H04W 76/30* (2018.02); *H04L 1/1812* (2013.01); *H04W 76/28* (2018.02)

(58) Field of Classification Search
CPC ..... H04W 76/27; H04W 76/28; H04W 76/30; H04W 76/20; H04L 1/1812; H04L 1/18; H04L 1/16; H04L 1/12
USPC ......................................................... 370/311
See application file for complete search history.

(56) References Cited

U.S. PATENT DOCUMENTS

| | | | | |
|---|---|---|---|---|
| 8,548,469 | B1 * | 10/2013 | Hietalahti | H04W 60/04 455/435.1 |
| 9,563,888 | B2 * | 2/2017 | Reeve | G06Q 20/32 |
| 2013/0188543 | A1 * | 7/2013 | Dwyer | H04W 72/04 370/311 |
| 2013/0223307 | A1 * | 8/2013 | Ohlsson | H04W 52/0216 370/311 |

(Continued)

OTHER PUBLICATIONS

3rd Generation Partnership Project TS 36.331 Radio Resource Control (RRC); Protocol specification V14.4.0 (Year: 2017).*

(Continued)

*Primary Examiner* — Jeffrey M Rutkowski
*Assistant Examiner* — Luna Weissberger
(74) *Attorney, Agent, or Firm* — Leveque IP Law, P.C.

(57) ABSTRACT

A system, device and methodology for releasing a connection between user equipment (UE) and a node in a communications network is disclosed. The method includes, at the UE, responsive to an application layer indication that no further data is expected by the UE, receiving a RRC connection release message from the node and transmitting, from the UE, a radio link control (RLC) status message using RLC acknowledged mode (AM) to the node. An early connection release timer at the UE and node based on RLC AM parameters for a signal radio bearer (SRB) is started and upon expiry of the early connection release timer, the node releases the RRC connection. This obviates the need to wait a full 10 s per the 3GPP standard to release the connection during periods of poor radio connectivity, and reduces power consumption at the UE.

18 Claims, 6 Drawing Sheets

(56) References Cited

U.S. PATENT DOCUMENTS

| | | | |
|---|---|---|---|
| 2014/0098694 A1* | 4/2014 | Damji | H04W 52/0229 |
| | | | 370/252 |
| 2014/0301288 A1 | 9/2014 | Koc et al. | |
| 2017/0064711 A1* | 3/2017 | Choi | H04L 5/00 |
| 2017/0188408 A1* | 6/2017 | Jung | H04W 76/14 |
| 2017/0331670 A1* | 11/2017 | Parkvall | H04J 11/0079 |
| 2018/0234838 A1* | 8/2018 | Mildh | H04W 8/22 |
| 2018/0332659 A1* | 11/2018 | Hwang | H04W 76/27 |

OTHER PUBLICATIONS

Mediatek Inc., "Report of Email Discussion [99#43] [NB-IoT] RRC Connection Release," 3GPP Draft; R2-1710795, vol. RAN WG2, No. Prague, Czech Republic, Oct. 8, 2017.
3GPP TS 36.322 Technical Specification, V14.1.0, Sep. 2009.
ZTE, "Remaining issues for quick release of RRC connection in FeNB-IoT," 3GPP Draft; R2-1712329, vol. RAN WG2, No. Reno, Nevada, Nov. 17, 2017.

\* cited by examiner

SYSTEM, METHOD AND DEVICE FOR EARLY CONNECTION RELEASE OF USER EQUIPMENT FROM COMMUNICATIONS NETWORK

FIELD OF THE INVENTION

The present invention relates generally to resource controls in a wireless communications network, and more particularly, to a method for releasing a signaling connection between User Equipment (UE) and the communications network in an efficient manner to save power.

BACKGROUND

The Universal Mobile Telecommunication System (UMTS) is a broadband Universal Terrestrial Radio Access Network (UTRAN) that enables packet based transmission of text, voice, and multi-media data. The UMTS subscribes to third generation (3GPP) standards and is predicated upon Wideband Code-Division Multiple Access (W-CDMA). In UTMS networks, a Radio Resource Control (RRC) component in the protocol stack assigns, configures and releases resources between the UE and the UTRAN. As set forth in 3GPP specification 36.331, section 5.3.8, when a RRC Connection Release is received, a UE needs to wait for a period of either 10 s or when lower layers in the protocol stack indicate receipt of an acknowledgement of receipt of the RCC Connection Release, whichever occurs first. If poor radio conditions are present, it is possible that a Radio Link Control (RLC) protocol Acknowledge Mode (AM) status PDU sent by the UE will never reach the eNodeB (eNB) in the network. Accordingly, the eNB will continue to retransmit as per the RLC AM configuration (poll retransmit timer+max retransmissions). After such retransmission, the eNB may assume the UE is out-of-service (OOS) or that the UE received one of the PDU retransmissions, and thus give up and release the connection. Since the UE waits for 10 s per the standard, unnecessary battery consumption occurs while maintaining radio link resources.

Thus, there exists a need for a novel and efficient method, system and apparatus that initiates an early connection release from the UTRAN when poor radio conditions exist.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
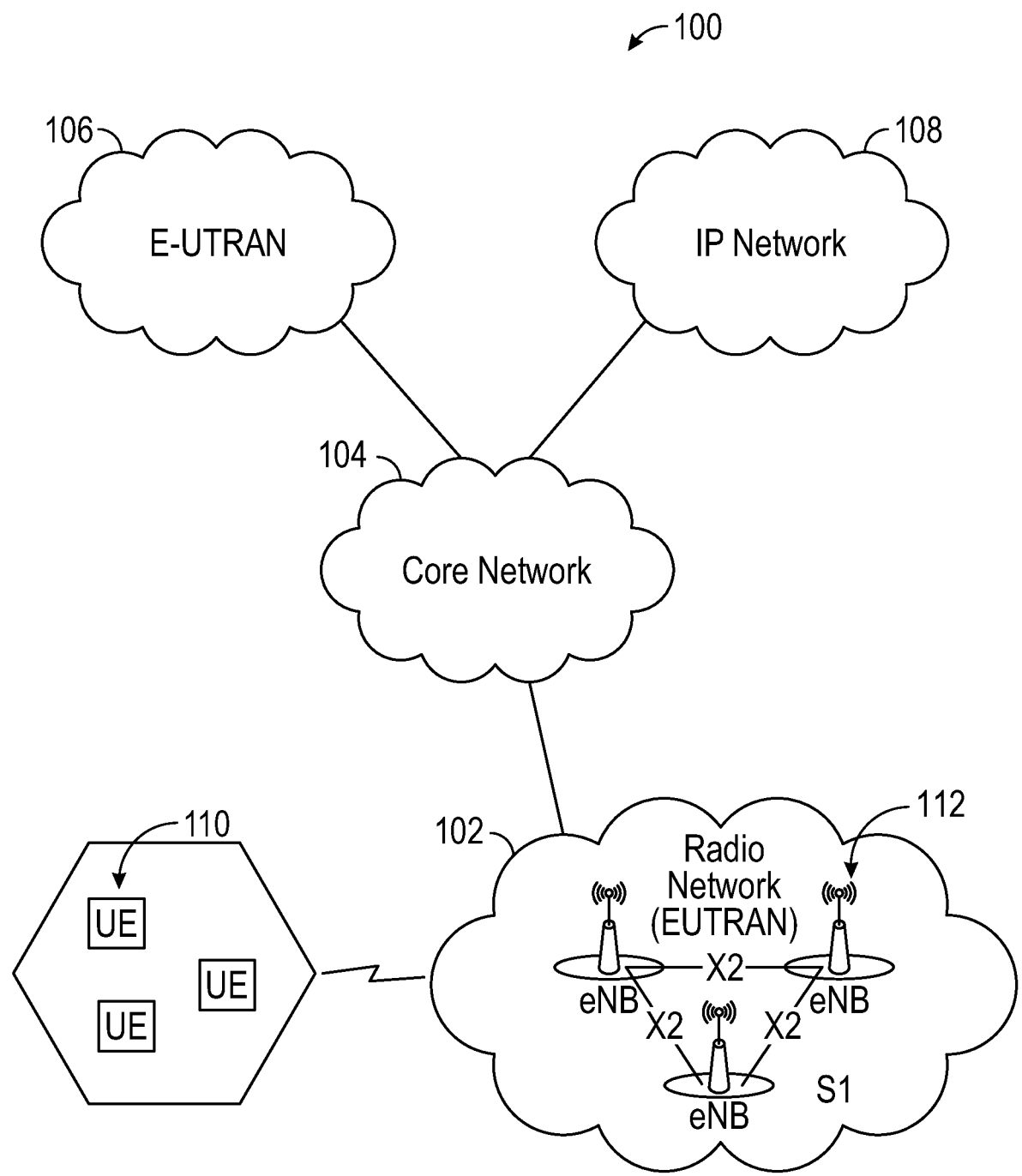
FIG. 1 is a high-level schematic diagram of an architecture of the Universal Mobile Telecommunications System (UMTS) network.

Specific embodiments of the disclosure will now be described in detail regarding the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more thorough understanding of the disclosure. However, it will be apparent to those skilled in the art that the disclosure may be practiced without these specific details. In other instances, well-known features have not been described in detail to avoid unnecessarily complicating the description.

It is to be understood that the terminology used herein is for the purposes of describing various embodiments in accordance with the present disclosure, and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period.

As used herein, the terms "about" or "approximately" apply to all numeric values, irrespective of whether these are explicitly indicated. Such terms generally refer to a range of numbers that one of skill in the art would consider equivalent to the recited values (i.e., having the same function or result). These terms may include numbers that are rounded to the nearest significant figure. In this document, any references to the term "longitudinal" should be understood to mean in a direction corresponding to an elongated direction of a personal computing device from one terminating end to an opposing terminating end.

Referring to FIG. 1, there is depicted a representative architecture of the Universal Mobile Telecommunications System (UMTS) network 100. The UMTS includes the broadband Universal Terrestrial Radio Access Network (UTRAN) or Evolved (E)-UTRAN 102, and a core network 104 that enables switching and routing data and connections to connected networks, e.g., E-UTRAN 106, Internet/Packet-Switched Network(s) 108, and other networks. User Equipment (UE) 110 communicates with an eNodeB 112 in E-UTRAN 102.

Figure 2:
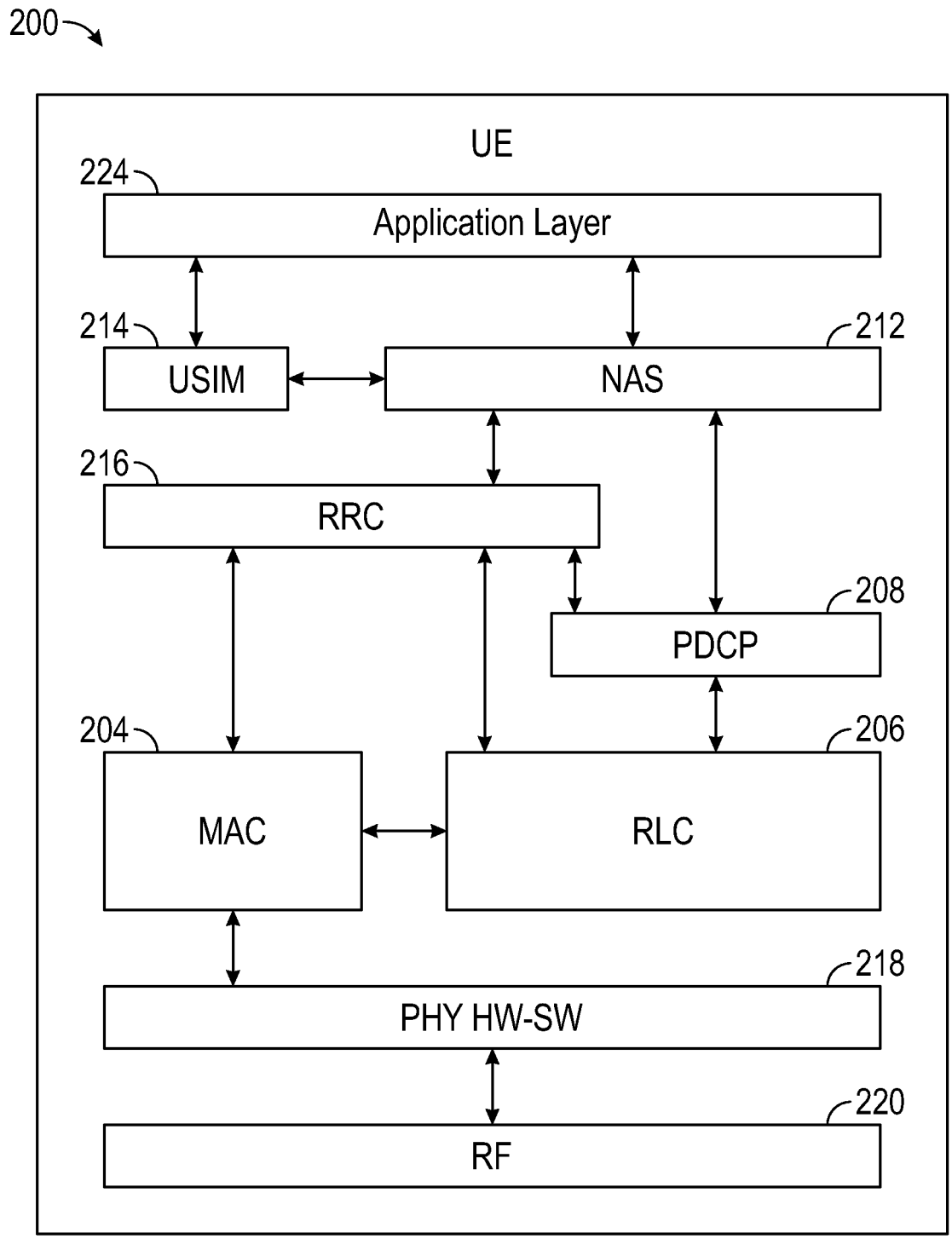
FIG. 2 is a schematic block diagram of a UE with a user-plane protocol stack for operation in the UMTS network of FIG. 1.

With reference now to FIG. 2, there is depicted a schematic block diagram of a UE 200 with a user-plane protocol stack 202 for operation in UMTS network 100 of FIG. 1. Protocol stack 202 passes service data unit (SDU) and protocol data unit (PDU) packets between layers of the stack as known in the art. The SDU data/information blocks are transmitted from a protocol at a layer N+1 that requests a service from a protocol at layer N (i.e., received by the layer). The PDU exchanges data/information between peer processes at the respective transmitter and receiver of the same protocol in a corresponding layer N (i.e., output of a layer). Protocol stack 202 includes Medium Access Control (MAC) 204, Radio Link Control (RLC) 206 and Packet Data Convergence Protocol (PDCP) 208. The RLC 206 and PDCP 208 sublayers terminate in the eNodeB in the network. NAS layer 212 is a functional layer in the UMTS wireless telecom protocol stack between the core network 104 and UE 200. NAS layer 212 manages establishment of communication sessions and maintains continuous communications with the UE as it moves throughout the network. The NAS 212 is logically coupled to a Universal Subscriber Identity Module (USIM) 214 and a Radio Resource Control layer (RRC) 216. Further, MAC 204 communicates with physical layer (PHY) 218 (hardware/software). The PHY 218 provides an electrical, mechanical, and procedural interface to the transmission medium, as is well known in the art. PHY 218 is coupled to the transmission circuitry/hardware 220. On the opposite end, Application Layer 224 resides as the highest layer and couples to USIM 214 and NAS 212. These expedients are well understood and depicted for illustrative purposes.

Figure 3:
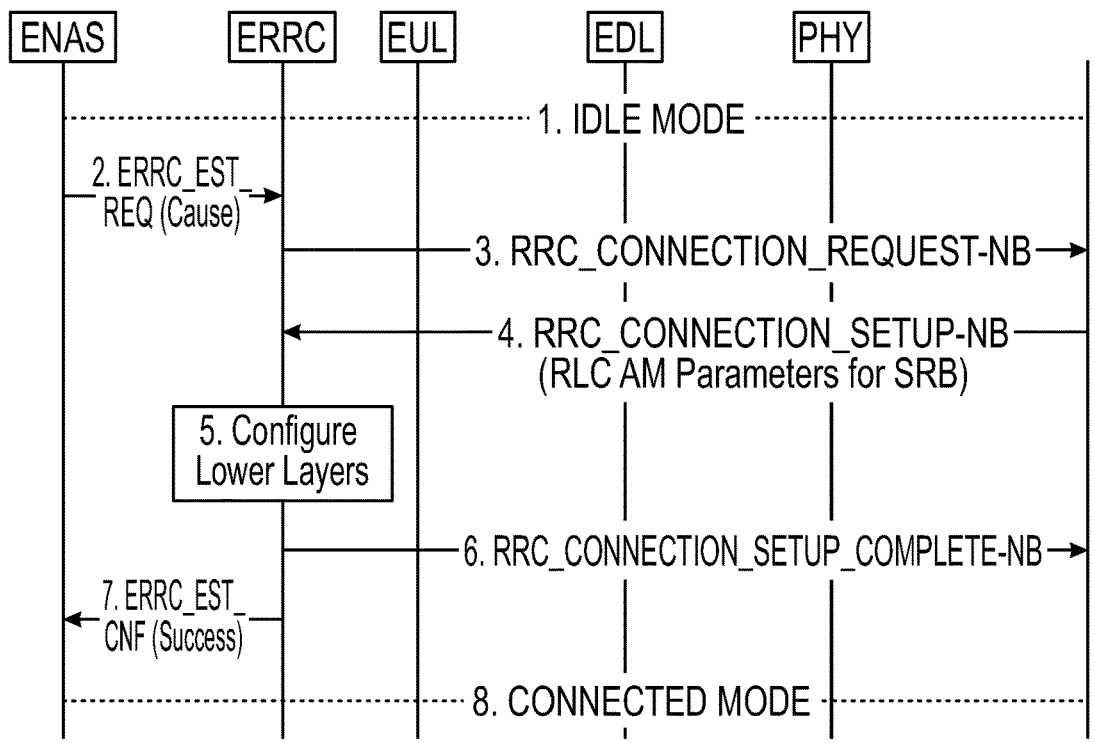
FIG. 3 is a timing diagram of a connection protocol in respect to 3GPP 36.331, section 5.3.8.

Referring now to FIG. 3, there is depicted a timing diagram of a connection protocol in respect to 3GPP 36.331, section 5.3.8. The enhanced non-access stratum (ENAS) layer sends an ERRC_EST_REQ message to the Enhanced Radio Resource Control (ERRC) layer. The ERRC then sends a RRC_CONNECTION_REQUEST-NB message to an eNodeB in the network. The eNodeB responds with an RRC_CONNECTION_SETUP-NB message with RLC AM parameters for the signaling Radio Bearer (SRB) that carries Dedicated Control Channel (DCCH) signaling data. After setting up the RLC AM parameters, the UE configures the lower layers of the protocol stack. An RRC_CONNECTION_SETUP_COMPLETE-NB message is sent from the ERRC to the eNodeB. The ERRC signals the ENAS of a successful setup via an ERRC_EST_CNF message.

Figure 4:
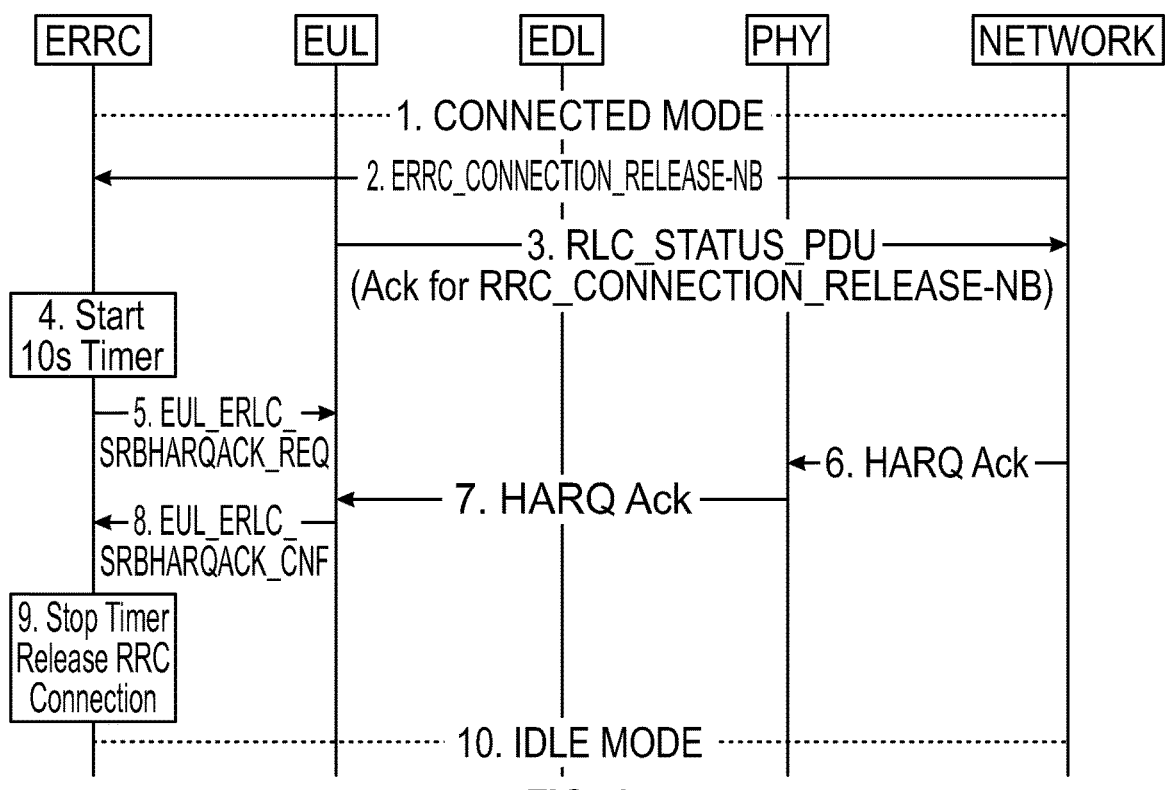
FIG. 4 is a timing diagram of an early connection release pursuant to 3GPP 36.331, section 5.3.8.

Referring now to FIG. 4, there is depicted a timing diagram of an early connection release pursuant to 3GPP 36.331, section 5.3.8. The UE is initially in the connected mode. The eNodeB sends a RRC_CONNECTION_RELEASE-NB message to the UE, at the ERRC layer, starting the release process. The Enhanced Uplink Layer (EUL) responds with a RLC_STATUS_PDU, which acknowledges the RRC_CONNECTION_RELEASE-NB. In accordance with the standard, the UE initiates the 10 s timer. The ERRC sends a hybrid automatic repeat request (EUL_ERLC_SRBHARQACK_REQ) message to the EUL. The eNodeB sends a HARQ_ACK message to the UE, which is received at the PHY and communicated to the EUL, which in turn sends an EUL_ERLC_SRBHARQAKC_CNF message to the ERRC. The UE then stops the 10 s timer, and the RRC Connection is released. The UE enters the idle mode.

Figure 5:
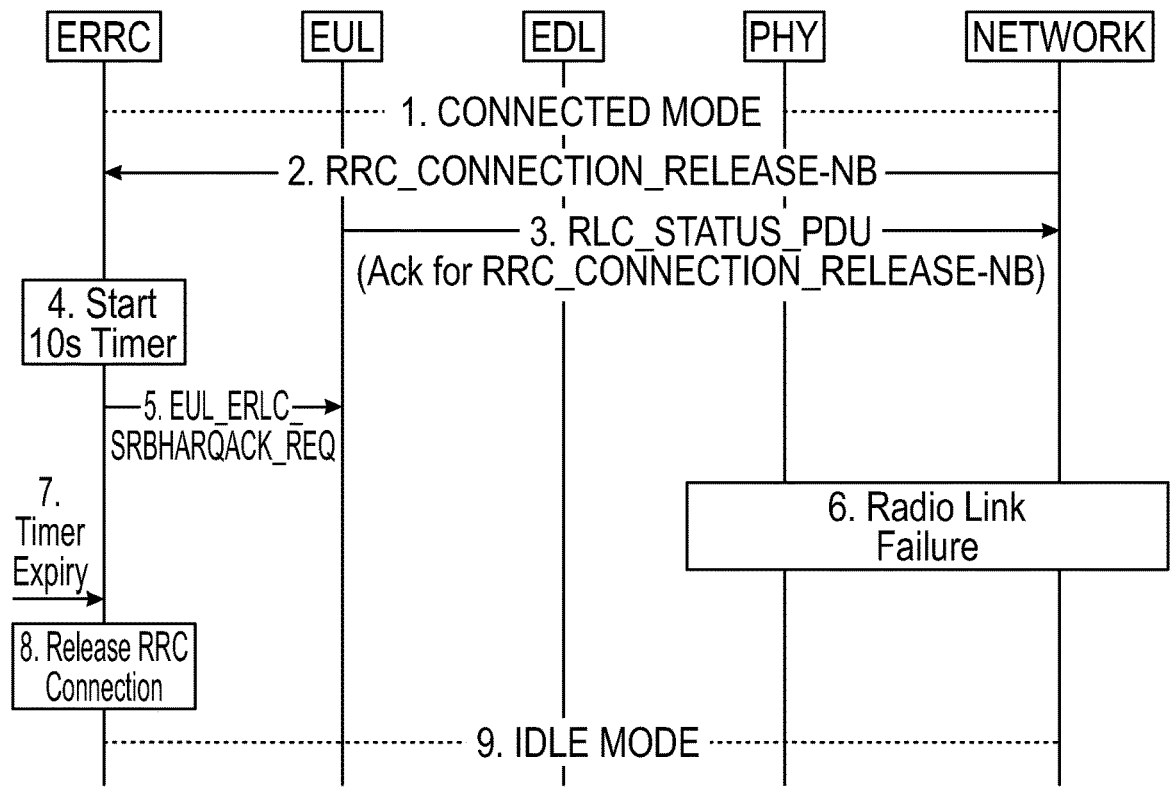
FIG. 5 is a timing diagram of the process illustrated in FIG. 4, where a radio link failure has occurred after the 10 s timer is initiated and the UE fails to receive an ACK from the eNodeB.

Referring now to FIG. 5, there is shown a timing diagram of the process illustrated in FIG. 4, where a radio link failure has occurred after the 10 s timer is initiated and the EUL_ERLC_SRBHARQACK_REQ message has been sent by the UE at the ERRC. In this case, the eNodeB never receives the acknowledgment from the UE, and the UE must wait the full 10 s prior to connection release.

Figure 6:
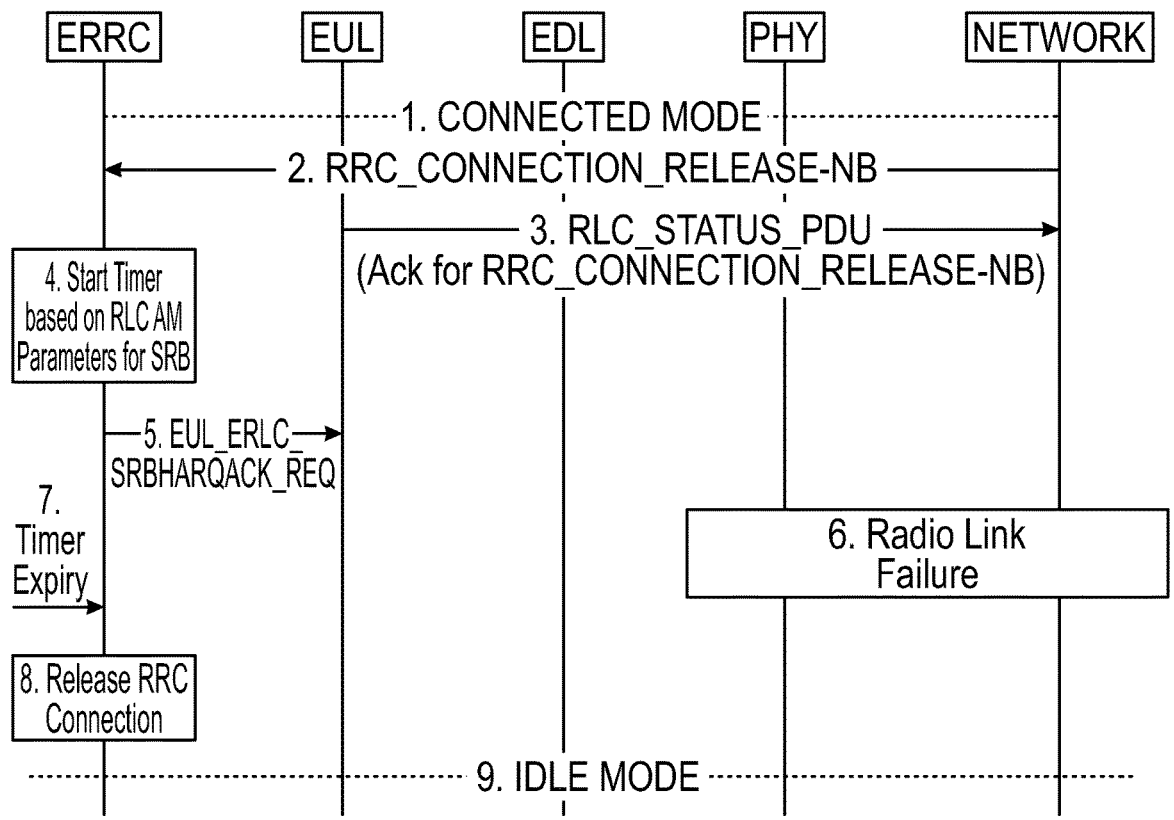
FIG. 6 is a timing diagram in accordance with an embodiment of the present disclosure.

Referring now to FIG. 6, there is shown a timing diagram in accordance with an embodiment of the present disclosure. As illustrated in FIGS. 4 and 5, the UE is in the connected mode. The eNodeB sends a RRC_CONNECTION_RELEASE-NB message to the UE, at the ERRC layer, starting the release process. The Enhanced Uplink Layer (EUL) responds with a RLC_STATUS_PDU, which acknowledges the RRC_CONNECTION_RELEASE-NB. The RRC Connection is received on SRB1 or SRB1bis. At the ERRC, a start timer is initiated based on RLC AM parameters for the SRB. The early connection release timer is based on t-PollRetransmit*maxRetxThreshold, representing a maximum time that the eNodeB retransmits to the UE. The t-PollRetransmit*maxRetxThreshold may be identical or different at the UE and the eNodeB. If there is a radio link failure, the connection may be released upon expiry of the early connection release timer in lieu of waiting 10 s per 3GPP 36.331, section 5.3.8, thereby saving battery consumption at the UE.

Figure 7:
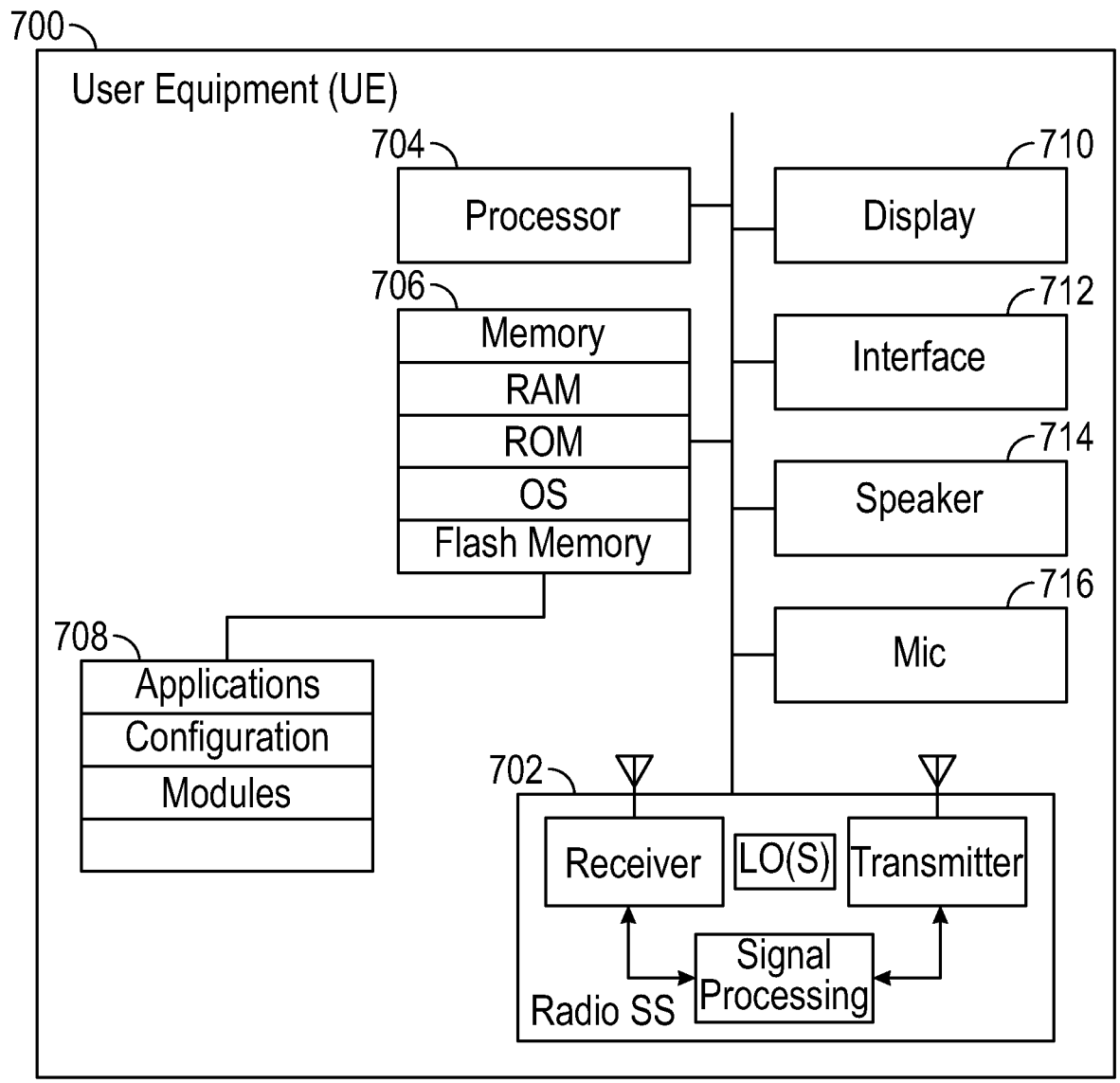
FIG. 7 is a high-level block diagram is depicted of a UE 700 in accordance with an embodiment of the present disclosure.

Referring now to FIG. 7, a high-level block diagram is depicted of a UE 700 in accordance with an embodiment of the present disclosure. UE 700 includes a radio subsystem 702, including transmitter and receiver circuitry, local oscillators, and digital signal processing circuitry of the type known in the art, and operable to communicate with a node in a communications network. Further, UE 700 includes at least one processor 704, and memory 706 coupled to the at least one processor 704 and storing computer program instructions 708 composed of computer usable program code that, when executed by the processor 704, cause UE 700 to perform the steps shown in the flow diagram of FIG. 8. The computer program instructions may be structured in one or more logical modules configured to perform the methodology described herein. It will be appreciated by those skilled in the art that the software implementation described in the foregoing may be implemented by a dedicated circuit(s) or firmware configured to be operable to carry out the inventive steps in accordance with the present embodiments. Further, similar software and hardware is provided at the eNodeB to carry out the corresponding features of the present disclosure at the network level. Further, UE 700 may include additional components as well known in the art of mobile communications devices, including but not limited to a display 710, user interface 712, either part of the display or physically separate therefrom, speaker 714 and microphone 716 for facilitating communications in a conventional manner.

Figure 8:
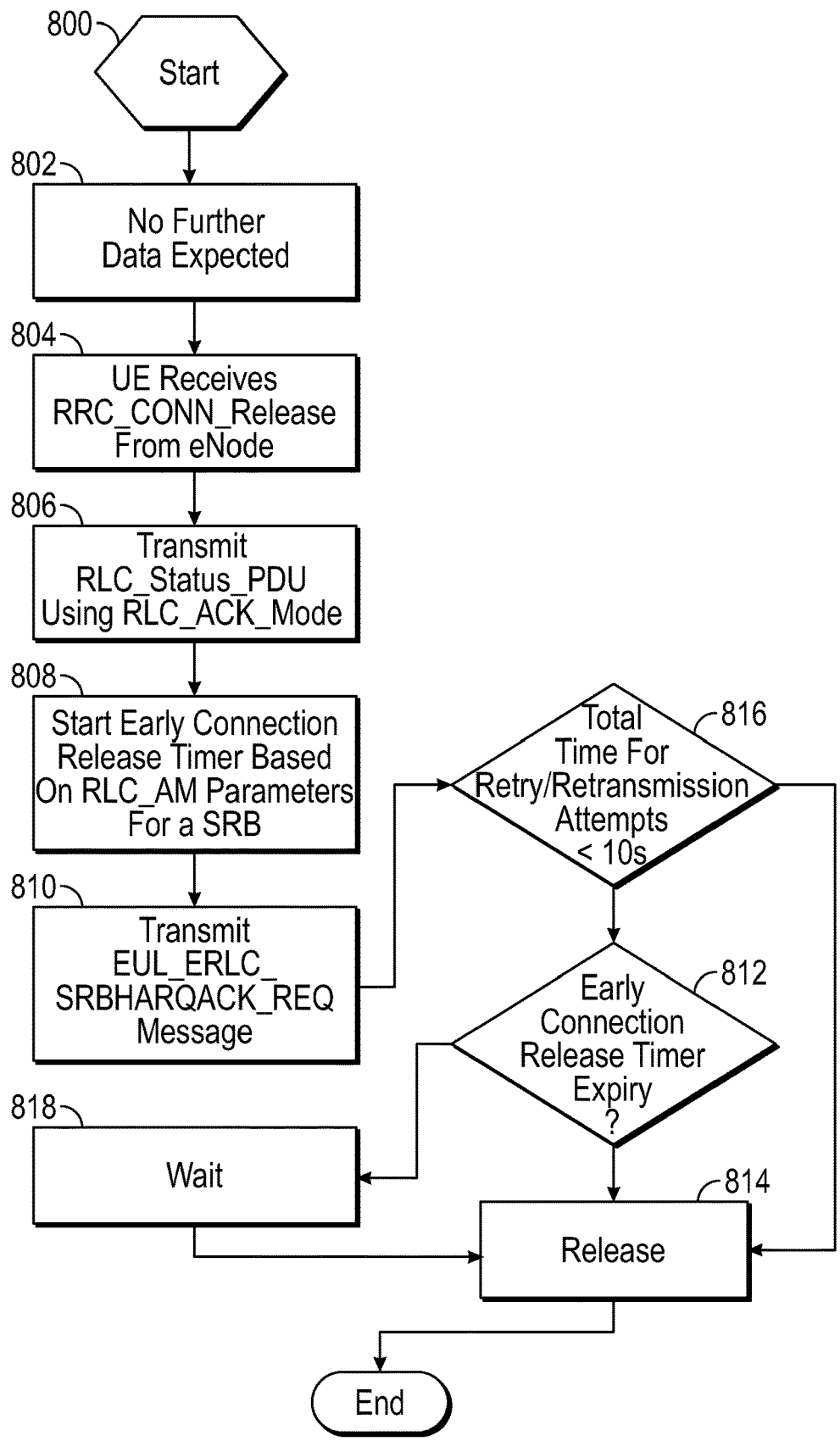
FIG. 8 is a flow diagram of a process at a UE for initiating an early connection release from the network in accordance with an embodiment of the present disclosure.

Referring to FIG. 8, there is shown a flow diagram of a process at a UE for initiating an early connection release from a communications network in accordance with an embodiment of the present disclosure. The process begins at block 800 and proceeds to block 802, where responsive to an application layer indication that no further data is expected by the UE, the UE receives an RRC_connection_release message from the node in the communications network at block 804. Next, at block 806, the UE transmits a radio link control (RLC)_Status_PDU_message using RLC acknowledged mode (AM) to the eNodeB in the communications network. At block 808, the early connection release timer is started based on RLC AM parameters for a SRB. At block 810, the UE transmits an EUL_ERLC_SRBHARQACK_REQ message from the ERRC to a RLC. If at block 816, the total time for retry/retransmission attempts is less than 10 s, then at block 814 the UE may release the connection upon expiry of the early connection release timer. Otherwise, the UE waits at block 818 for the 10 s timer to expire per 3GPP 36.331, section 5.3.8. If there is a radio failure prior to expiry of the 10 s timer, the early connection release mechanism permits an early release, thereby saving power and prolonging battery life at the UE.

The terms "program," "software application," and the like, as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The present disclosure may be embodied within a system, a method, a computer program product or any combination thereof. The computer program product may include a computer readable storage medium or media having computer readable program instructions thereon for causing a processor to carry out embodiments of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Embodiments of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform embodiments of the present disclosure.

Accordingly, embodiments and features of the present disclosure are set out in the following in the following numbered items:

1. A method of releasing a connection between user equipment (UE) and a node in a communications network, comprising: responsive to an application layer indication that no further data is expected by the UE, receiving a connection release message from the node in the communications network; transmitting, from the UE, a radio link control status message using radio link control acknowledged mode to the node in the communications network; starting an early connection release timer based on radio link control acknowledged mode parameters for a signal radio bearer; a hybrid automatic repeat request message (HARQ) from an enhanced radio resource control (ERRC) layer to a radio link control (RLC) layer; and upon expiry of the early connection release timer, releasing the RRC connection.

2. The method of item 1, where the early connection release timer comprises t-PollRetransmit*maxRetxThreshold, representing a maximum time that the node retransmits to the UE.

3. The method of item 2, where the RRC connection is released upon expiry of the early connection release timer prior to a specified 10 s delay for narrow band (NB)-IoT from at least one of: when the RRC connection release message was received; and lower layers indicate that receipt of the RRC connection release message has been ACK.

4. The method of item 2, where t-PollRetransmit*maxRetxThreshold are identical at the UE and the node.

5. The method of item 2, where t-PollRetransmit*maxRetxThreshold at are different at the UE and the node.

6. The method of item 1, where the RRC connection is received on at least one of SRB1 and SRB1bis.

7. The method of item 1, where the communications network comprises a Universal Terrestrial Radio Access Network (UTRAN)

8. The method of item 1, where the communications network is a Universal Mobile Telecommunications System (UMTS) network.

9. The method of item 7, where the UTRAN is an Evolved (E)-UTRAN and the node is an eNodeB (eNB).

10. A user equipment (UE), comprising: a radio subsystem operable to communicate with a node in a communications network; at least one processor; memory coupled to the at least one processor, the memory storing computer program instructions that, when executed by the processor, cause the UE to: responsive to an application layer indication that no further data is expected by the UE, receive an RRC_connection_release message from the node in the communications network; transmit, from the UE, a radio link control (RLC)_Status_PDU_message using RLC acknowledged mode (AM) to the node in the communications network; start an early connection release timer based on RLC AM parameters for a signal radio bearer (SRB); transmit an EUL_ERLC_SRBHARQACK_REQ message from an enhanced radio resource control (ERRC) to a RLC; and upon expiry of the early connection release timer, release the RRC connection.

11. The UE of item 10, where the early connection release timer comprises t-PollRetransmit*maxRetxThreshold, representing a maximum time that the node retransmits to the UE.

12. The UE of item 11, where the RRC connection is released upon expiry of the early connection release timer prior to a specified 10 s delay for narrow band (NB)-IoT from at least one of: when the RRC connection release message was received; and lower layers indicate that receipt of the RRC connection release message has been ACK.

13. The UE of item 11, where t-PollRetransmit*maxRetxThreshold are identical at the UE and the node.

14. The UE of item 11, where t-PollRetransmit*maxRetxThreshold at are different at the UE and the node.

15. The UE of item 10, where the RRC connection message is received on at least one of SRB1 and SRB1bis.

16. The UE of item 10, where the communications network comprises a Universal Terrestrial Radio Access Network (UTRAN)

17. The UE of item 10, where the communications network is a Universal Mobile Telecommunications System (UMTS) network.

18. The UE of item 16, where the UTRAN is an Evolved (E)-UTRAN and the node is an eNodeB (eNB).

19. A node in a Universal Terrestrial Radio Access Network (UTRAN), comprising: at least one processor; memory coupled to the at least one processor, the memory storing computer program instructions that, when executed by the processor, cause the node to: responsive to an application layer indication that no further data is expected by a UE connected to the node, transmit an RRC_connection_release message to the UE; receive, from the UE, a radio link control (RLC)_Status_PDU message using RLC acknowledged mode (AM); start an early connection release timer based on RLC AM parameters for a signal radio bearer (SRB); and upon expiry of the early connection release timer, release the RRC connection.

20. The node of item 19, where the early connection release timer comprises t-PollRetransmit*maxRetxThreshold, representing a maximum time that the node retransmits to the UE.

21. The node of item 20, where the RRC connection is released upon expiry of the early connection release timer prior to a specified 10 s delay for narrow band (NB)-IoT from at least one of: when the RRC connection release was received; and lower layers indicate that receipt of the RRC connection release has been ACK.

22. The node of item 20, where t-PollRetransmit*maxRetxThreshold are identical at the UE and the node.

23. The node of item 20, where t-PollRetransmit*maxRetxThreshold at are different at the UE and the node.

24. The node of item 19, where the RRC connection message is transmitted on at least one of SRB1 and SRB1bis.

25. The node of item 19, where the communications network comprises a Universal Terrestrial Radio Access Network (UTRAN)

26. The node of item 19, where the communications network is a Universal Mobile Telecommunications System (UMTS) network.

27. The node of claim 25, where the UTRAN is an Evolved (E)-UTRAN and the node is an eNodeB (eNB).

In accordance with the foregoing, a novel method, system and . . . for . . . has been disclosed. Having thus described the invention of the present application in detail and by reference to embodiments thereof, it will be apparent that modifications and variations are possible without departing from the scope of the invention defined in the appended claims as follows:

We claim:

1. A method of releasing a radio resource control (RRC) connection between user equipment (UE) and a node in a communications network, comprising:
responsive to an application layer indication that no further data is expected by the UE,
receiving a RRC connection release message from the node in the communications network;

transmitting, to the node, a radio link control (RLC) status message using RLC acknowledged mode (AM);
starting an early connection release timer based on RLC AM parameters for a signaling radio bearer (SRB), where the early connection release timer is set to expire in less than an RRC connection release delay value, and where the RRC connection release delay value is 10 seconds;
sending a hybrid automatic repeat request message from an enhanced radio resource control (ERRC) layer to an RLC layer; and
upon expiry of the early connection release timer, releasing the RRC connection,
where the early connection release timer is set to expire at a time determined based on t-PollRetransmit and maxRetxThreshold, and
where the early connection release timer is identical at the UE and the node or the early connection release timer is different at the UE and the node.

2. The method of claim 1, where the RRC connection is released when lower layers indicate that receipt of the RRC connection release message has been acknowledged.

3. The method of claim 1, where the RRC connection is received on at least one of SRB1 and SRB1bis.

4. The method of claim 1, where the communications network comprises a Universal Terrestrial Radio Access Network (UTRAN).

5. The method of claim 1, where the communications network is a Universal Mobile Telecommunications System (UMTS) network.

6. The method of claim 4, where the UTRAN is an Evolved (E)-UTRAN and the node is an eNodeB (eNB).

7. A user equipment (UE), comprising:
a radio subsystem operable to communicate with a node in a communications network using a radio resource control (RRC) connection;
at least one processor;
memory, coupled to the at least one processor, storing computer program instructions that, when executed by the processor, cause the UE to:
responsive to an application layer indication that no further data is expected by the UE, receive a RRC connection release message from the node in the communications network;
transmit, to the node, a radio link control (RLC) status message using RLC acknowledged mode (AM);
start an early connection release timer based on RLC AM parameters for a signaling radio bearer (SRB), where the early connection release timer is set to expire in less than an RRC connection release delay value, and where the RRC connection release delay value is 10 seconds;
send a hybrid automatic repeat request message from an enhanced radio resource control (ERRC) layer to an RLC layer; and
upon expiry of the early connection release timer, release the RRC connection,
where the early connection release timer is set to expire at a time determined based on t-PollRetransmit and maxRetxThreshold, and
where the early connection release timer is identical at the UE and the node or the early connection release timer is different at the UE and the node.

8. The UE of claim 7, where the RRC connection is released when lower layers indicate that receipt of the RRC connection release message has been acknowledged.

9. The UE of claim 7, where the RRC connection message is received on at least one of SRB1 and SRB1bis.

10. The UE of claim 7, where the communications network comprises a Universal Terrestrial Radio Access Network (UTRAN).

11. The UE of claim 7, where the communications network is a Universal Mobile Telecommunications System (UMTS) network.

12. The UE of claim 10, where the UTRAN is an Evolved (E)-UTRAN and the node is an eNodeB (eNB).

13. A node in a communications network, comprising:
at least one processor;
memory, coupled to the at least one processor, storing computer program instructions that, when executed by the processor, cause the node to:
responsive to an application layer indication that no further data is expected by a UE connected to the node, transmit a radio resource control (RRC) connection release message to the UE; where the UE is connected to the node by an RRC connection; and
receive, from the UE, a radio link control (RLC) status message using RLC acknowledged mode (AM);
where the UE starts an early connection release timer based on RLC AM parameters for a signaling radio bearer (SRB),
where the early connection release timer is set to expire in less than an RRC connection release delay value,
where the RRC connection release delay value is 10 seconds,
where, upon expiry of the early connection release timer, the UE releases the RRC connection,
where the early connection release timer is set to expire at a time determined based on t-PollRetransmit and maxRetxThreshold, and
where the early connection release timer is identical at the UE and the node or the early connection release timer is different at the UE and the node.

14. The node of claim 13, where the RRC connection is released when lower layers indicate that receipt of the RRC connection release has been acknowledged.

15. The node of claim 13, where the RRC connection message is transmitted on at least one of SRB1 and SRB1bis.

16. The node of claim 13, where the communications network comprises a Universal Terrestrial Radio Access Network (UTRAN).

17. The node of claim 13, where the communications network is a Universal Mobile Telecommunications System (UMTS) network.

18. The node of claim 16, where the UTRAN is an Evolved (E)-UTRAN and the node is an eNodeB (eNB).

* * * * *